United States Patent [19]
Mulder et al.

[11] Patent Number: 5,994,907
[45] Date of Patent: Nov. 30, 1999

[54] APPARATUS FOR CAPACITIVE MEASUREMENTS

[75] Inventors: Richard Mulder, Capelle A/D Ijssel; Marian J. W. Slezak, Rijsbergen; Cornelis W. P. Schoenmakers, Rotterdam, all of Netherlands

[73] Assignee: Meridian Instruments B.V., Breda, Netherlands

[21] Appl. No.: 08/875,771

[22] PCT Filed: Feb. 6, 1996

[86] PCT No.: PCT/NL96/00058

§ 371 Date: Dec. 5, 1997

§ 102(e) Date: Dec. 5, 1997

[87] PCT Pub. No.: WO96/24823

PCT Pub. Date: Aug. 15, 1996

[30] Foreign Application Priority Data

Feb. 6, 1995 [NL] Netherlands ............................. 9500217

[51] Int. Cl.⁶ .................................................. G01R 27/26
[52] U.S. Cl. ............................. 324/674; 324/671; 331/65
[58] Field of Search .................................... 324/660, 661, 324/671, 690, 674, 675, 682; 331/64, 95

[56] References Cited

U.S. PATENT DOCUMENTS

| | | | |
|---|---|---|---|
| 2,932,970 | 4/1960 | Zito | 331/65 |
| 3,378,638 | 4/1968 | Weingartner | 331/65 |
| 4,912,976 | 4/1990 | Labriola | 331/65 |

*Primary Examiner*—Maura Regan
*Attorney, Agent, or Firm*—Banner & Witcoff, Ltd.

[57] ABSTRACT

The invention relates to an apparatus for measuring the capacitance between at least a conductive part of a wall of a vessel and a measuring electrode situated in the vessel and carrying a measuring voltage, comprising a measuring circuit and a compensating circuit for applying a compensating voltage as nearly as possible the same as the measuring voltage to conductors present in the vicinity of conductors carrying the measuring voltage, wherein the capacitance between the measuring electrode and the vessel wall is connected as frequency determining element in an oscillator, so that the frequency of the measuring signal is related to the value of the capacitance. Frequency is a quantity which can be measured much better, can be determined much more precisely, requires less complicated circuits and can be largely implemented in integrated form. According to a first embodiment, the period of the measuring signal is substantially proportional to the capacitance, and the measuring circuit is adapted to measure the period of the measuring signal.

20 Claims, 4 Drawing Sheets

APPARATUS FOR CAPACITIVE MEASUREMENTS

The invention relates to an apparatus for measuring the capacitance between at least a conductive part of a wall of a vessel and a measuring electrode situated in the vessel and carrying a measuring voltage, comprising a measuring circuit and a compensating circuit for applying a compensating voltage as nearly as possible the same as the measuring voltage in the vicinity of the conductors carrying the measuring voltage.

Such apparatuses are known, for instance from EP-A-0 101 580.

As a consequence of these prior art steps the influence of parasitic capacities is eliminated to the greatest possible extent, so that the measuring range of the circuit becomes available to the greatest possible extent and accuracy is increased.

In this prior art circuit the measuring capacitance is measured by means of phase shift of the measuring signal. Phase shift is a quantity which is difficult to measure, so that measurement thereof is difficult, involves inaccuracies and a complicated measuring circuit using much power is required.

The object of the present invention is to avoid the above stated problems.

This object is achieved in that the capacitance between the measuring electrode and the vessel wall is connected as a frequency determining element in an oscillator, so that the frequency of the measuring signal is related to the value of the capacitance.

Frequency is a quantity which can be measured much better, can be determined much more precisely, requires less complicated circuits and can be largely implemented in integrated form.

According to a preferred embodiment the period of the measuring signal is substantially proportional to the capacitance and the measuring circuit is adapted to measure the period. This is a quantity which is likewise easy to measure and which is moreover proportional to the capacitance value for measuring.

Other attractive preferred embodiments will be found in the remaining claims.

The present invention will be elucidated hereinbelow with reference to annexed drawings, wherein.

Figure 1:
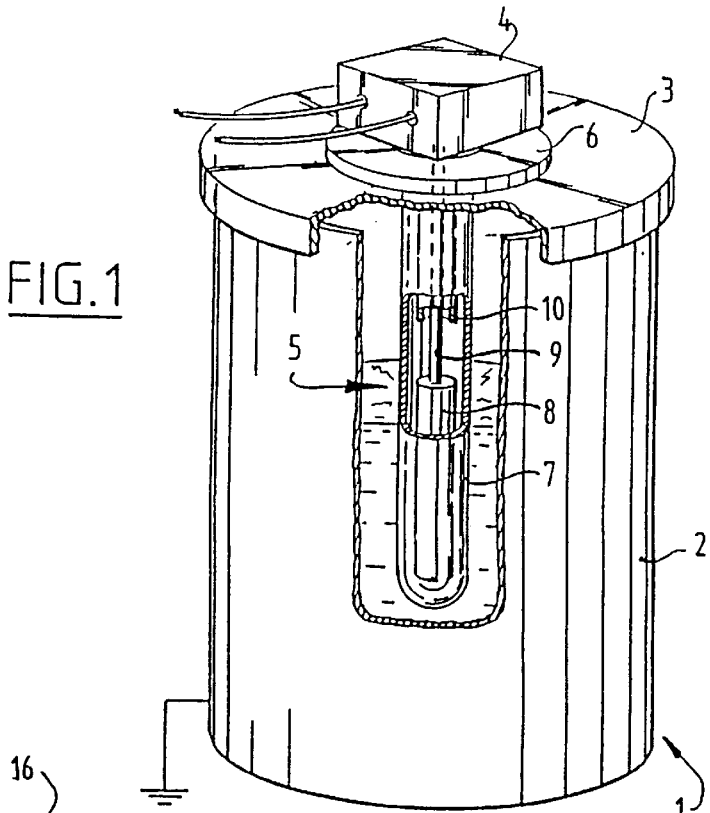
FIG. 1 shows a partly broken away perspective view of a cylindrical measuring vessel with a centrally arranged electrode as part of the apparatus according to the invention.

FIG. 1 shows a measuring vessel 1 which is formed by a housing 2 on which is placed a cover 3. Placed on cover 3 is a casing 4 in which the circuit of the measuring apparatus according to the invention is arranged. The casing 4 is connected to an electrode body 5 which is arranged in the interior of housing 2 by means of a lead-through 6 through cover 4.

In this embodiment the vessel has the shape of a straight circular cylinder. It is also possible to use a vessel with a different cylinder shape, for instance a rectangular cylinder. It is even possible to use a non-cylindrical vessel.

The electrode body 5 comprises a housing 7 which is manufactured from insulating material and inside which is placed a measuring electrode 8 which is connected by means of a central rod 9 to the measuring circuit present in casing 4. Around the rod 9 but inside the housing 7 is arranged a guard electrode 10.

It will be apparent that the capacitance between measuring electrode 8 and housing 2, which is normally earthed for safety reasons, is influenced by the nature of the substance with which the vessel is filled and by the degree to which the vessel is filled. The nature of the substance here refers particularly to the electrical permittivity. The capacitance is thus a measure for the degree of filling of the vessel or the quality of the substance in the vessel.

This property will be used to perform measurements, in particular to perform level measurements. For this purpose it is of course important to measure the capacitance as precisely as possible. In order to cut out or eliminate parasitic capacities to the greatest possible extent, use is made of the guard electrode 10, the potential of which is kept as nearly equal as possible to the potential of the measuring electrode 8. As a consequence of these steps as small as possible or no electrostatic field is present between the measuring electrode 8 and the screening 10, so that the parasitic capacitance present therebetween is eliminated.

Figure 2:
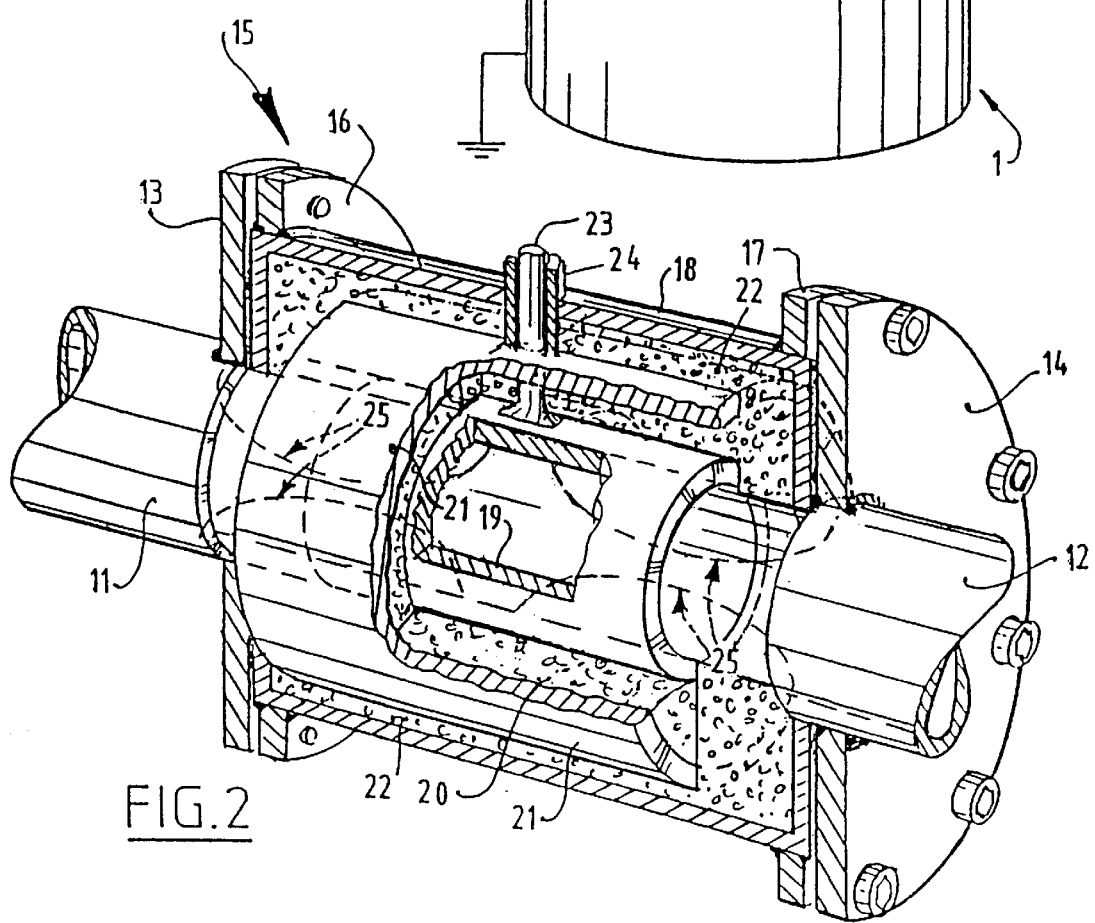
FIG. 2 shows a sectional view of a cylindrical measuring vessel according to a second embodiment.

In FIG. 2 is shown a second configuration in which the measuring apparatus according to the invention can be used. In this configuration a vessel is formed by two pipe ends 11,12 which are provided on their ends with flanges 13 respectively 14 and between which is placed a measuring pipe piece 15. The latter is formed by two flanges 16 and 17 connected by a cylinder 18. All components described up to this point are manufactured from conducting material, for instance steel or stainless steel.

Arranged in the interior of the measuring pipe piece 18 is a measuring electrode 19 around which an insulation layer 20 is arranged. Around the insulation layer 20 is arranged a guard electrode 21 which is separated from cylinder 18 by means of a second insulation layer 22. In this situation the measuring electrode 19 is connected by means of a measuring cable 23 to the measuring circuit (not shown), while the guard electrode 21 is connected to the screening 24 of the cable 23. This screening 24 is fed by the compensating circuit.

As a result of these steps it is possible to measure the capacitance between the measuring electrode 19 and the walls of the pipe pieces 11 and 12 and the earthed parts of the housing 18, whereby an accurate measurement can likewise be performed without problems of parasitic capacities. In FIG. 2 the measuring field is designated with lines of flux 25.

Figure 3:
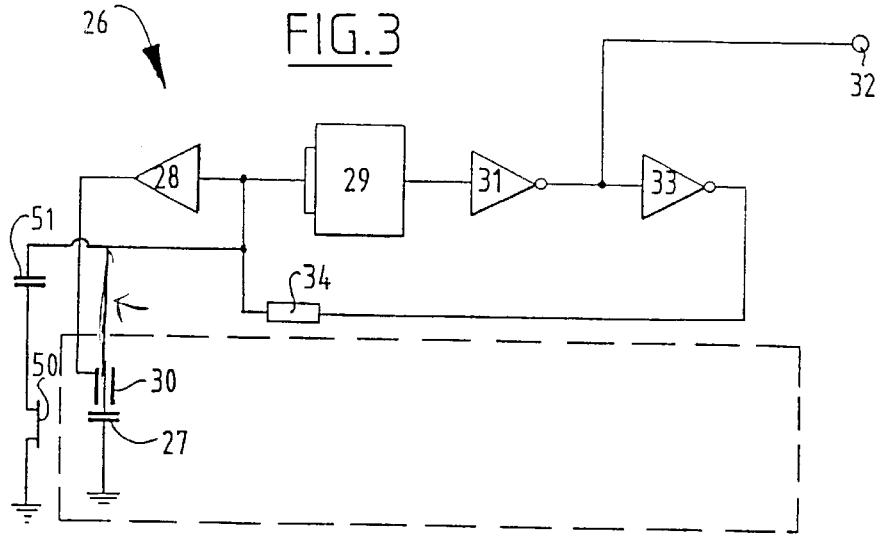
FIG. 3 shows a block diagram of the oscillator circuit which forms part of the apparatus according to the present invention.

FIG. 3 shows a block diagram of the oscillator circuit used to perform the capacitance measurement. Oscillator 26 is formed by a comparator circuit 29, the input terminal of which is connected to the capacitance for measuring which is designated with 27 in FIG. 3. This capacitance represents the capacitance between the measuring electrode and the housing of the vessel. Here also the vessel wall is earthed.

The comparator circuit 29 can be formed by two separate comparator circuits in the form of for instance normal operational amplifiers; a switching operation must in any case be carried out when both the maximum measuring voltage and the minimum measuring voltage are reached. It is however possible according to the invention to make use of a single comparator circuit when the output voltage is fed back in the correct manner; this limits the number of components.

The output terminal of the comparator circuit 29 is connected to an inverter 31 which is embodied as a gate in the present embodiment. The output terminal 32 of the oscillator circuit is connected to the output terminal of the inverter 31. Connected to the output terminal of comparator circuit 29 is the input terminal of a second inverter 33, which can also be formed by a gate. The output terminal of the second inverter 33 is connected via a resistor 34 to the input terminal of comparator circuit 29 in order to obtain the feedback required for oscillation. The frequency of the signal generated by the oscillator and available at output terminal 32 is determined by the value of the resistor 34 (R) and the value of the capacitance 27 (C) according to the formula $$F=1/(1.4\ RC).$$

It will be apparent that the above mentioned oscillator circuit can be used to measure the value of the capacitance 27 by means of measuring the period of the measuring signal.

Also connected to the input terminal of the comparator circuit 29 is the output terminal of a buffer circuit 28, the output terminal of which is connected to the screening 30 of the measuring electrode, or of the cable connecting the measuring electrode to the circuit.

Figure 4:
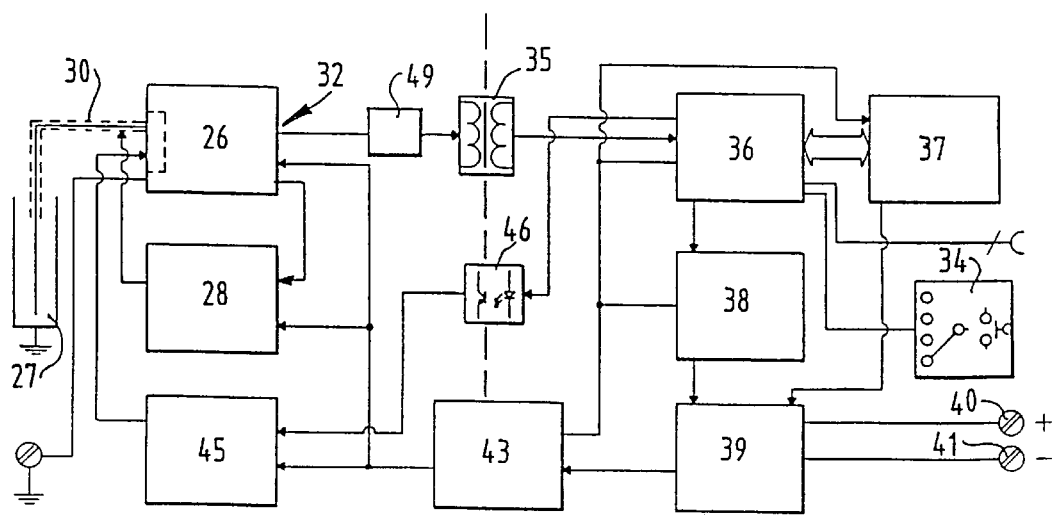
FIG. 4 shows a block diagram of the full circuit according to the invention.

FIG. 4 further shows a further extension of the circuit, so that a circuit is obtained which is can be used in practice, for instance in process techniques. FIG. 4 again shows oscillator 26, wherein buffer circuit 28 is shown as a separate circuit in the drawing. The output terminal 32 of oscillator 26 is connected via a frequency divider 49 and a transformer 35 to a microprocessor 36 which provides measurement of the period of the measuring signal. Use is herein made for instance of a divider 49 to divide the periods of the measuring signal which are short due to the low capacitance values into longer periods which can be measured more easily and —more importantly—more accurately. The thus obtained output signal is subsequently fed to a modem 37 which can provide further data transfer of the signal. It is otherwise also possible to integrate the frequency divider into the microprocessor.

For generating of an analog output signal the microprocessor is connected to a D/A converter 38. The D/A converter 38 is further connected to a buffer circuit 39. The buffer circuit 39 serves on the one hand to transmit the supply voltage provided at terminals 40,41 to a supply circuit 43. Buffer circuit 39 further serves to vary the impedance "visible" from the outside between input terminals 40,41 such that on the supply voltage of the circuit a data carrying flow is superimposed which functions as output for the circuit. For this purpose buffer circuit 39 comprises an element with an adjustable impedance which is connected in parallel to the load formed by the supply circuit 43. By adjusting this impedance, which takes place using D/A converter 38, an analog signal in the form of a variation in the supply current is thus superimposed on the supply current, which signal can be read on the supply side to obtain the relevant information. In the present circuit a digital signal is also superimposed on the supply current. The analog and data carrying signal and the digital data carrying signal are essentially combined and subsequently used for "modulation" of the resistance of circuit 39.

It is herein pointed out that the circuit implemented by applicant has a nominal supply voltage of 24 volts. The circuit is however dimensioned such that it will still also just function at a supply voltage of 12 volts, which supply voltage is decreased for instance as a result of voltage loss in the possibly kilometers-long supply line.

A current consumption occurs herein of about 4 mA. By superimposing the analog and/or digital signal on this current the latter can reach greater values, for instance up to a maximum of 20 mA. The current range between 4 mA and 20 mA is then available as amplitude for the analog measuring signal. The digital signal only requires an amplitude of about 0.5 mA.

A galvanic separation is arranged in the supply circuit, for instance by means of a transformer. In order to control the circuit at the location of this circuit a switch 44 is arranged which is connected to the microprocessor 36.

Different operational modes of the circuit can hereby be switched on, for instance the amplitude of the analog output signal or switching on of a test position. In the test position a signal is fed by microprocessor 36 to a test circuit 45 which feeds a test signal to measuring circuit 26 with which the operation of the measuring circuit is tested.

For testing of the circuit use is made of a switch, for instance a FET 50 connected to earth through a test capacitor 51, which is connected to the junction of the resistor 34 and the connection for the capacitance for measuring. The test capacitor is normally incorporated in the measuring circuit by short circuiting the switch, but by opening the switch the test capacitor is removed from the measuring circuit. The value of the test capacitor can always be taken into account by means of the processor. The switch then forms an ideal short circuit. During testing, when no measuring result is obtained but wherein only a response is expected, the non-ideal impedance of the switch has no significance.

Arranged in the connection between the microprocessor and test circuit 45 is a galvanic separation in the form of an opto-coupler 46.

Figure 5:
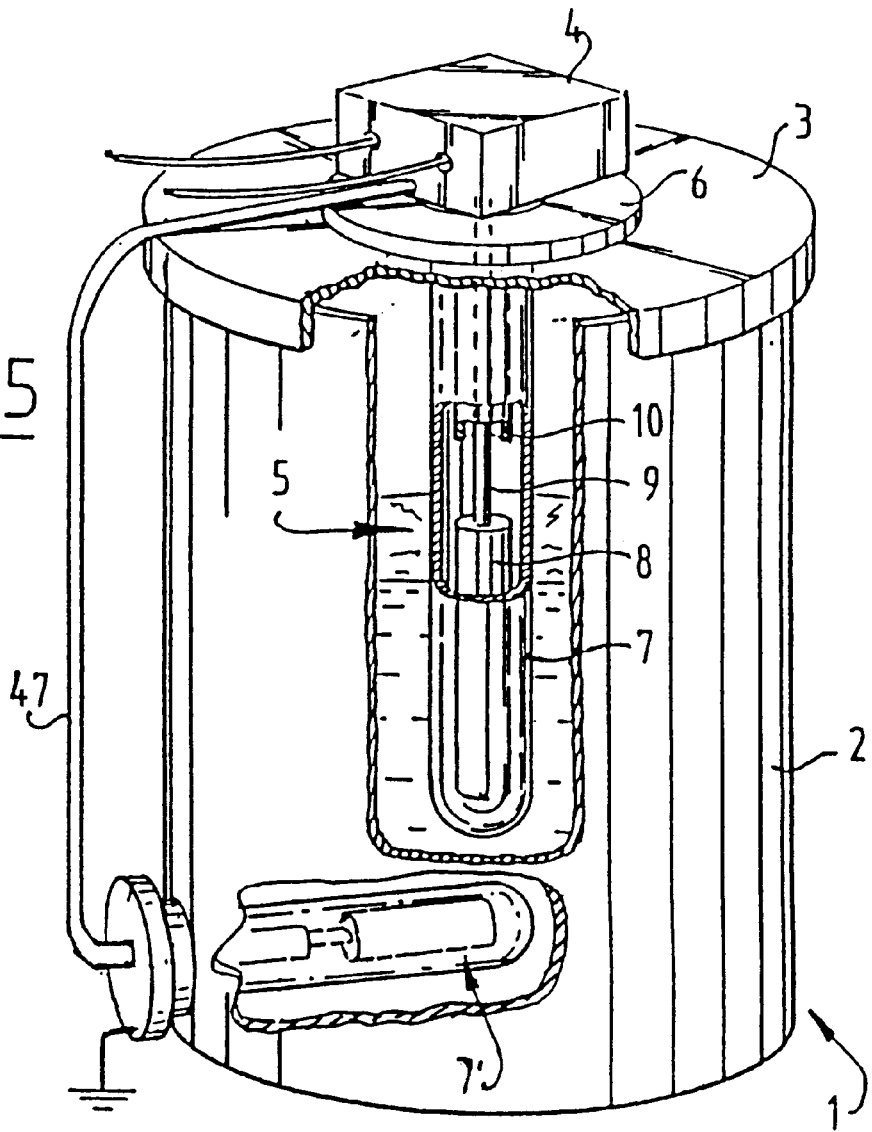
FIG. 5 is a sectional view of a variant of the first embodiment.

The embodiment shown in FIG. 5 corresponds to the embodiment shown in FIG. 1, with the difference that a second electrode body 7' is arranged, the construction of which wholly corresponds with that of electrode body 7, which electrode body is connected to a coax cable 47 which leads to the casing 4 associated with the first electrode body 7.

The electrode body 7' is placed such that it is also enclosed by material with which vessel 2 is filled in the case of a small degree of filling of vessel 2. This results in the capacitance between the electrode of electrode body 7' and the vessel wall 2 being a representation of the permittivity of the content of vessel 2 and not, or hardly so, of the degree to which vessel 2 is filled. Conversely, the capacitance between electrode body 7 and vessel 2 is a measure for both the permittivity of the content and the degree of filling.

Due to the availability of two signals representing the capacitance of each of the electrodes it is possible to compensate for the permittivity the signal representing both the degree of filling and the permittivity so that said signal represents only the degree of filling. This is particularly important in situations where the permittivity of the content of the vessel varies, for instance as a consequence of variations in temperature, degree of humidity or another quality.

Figure 6:
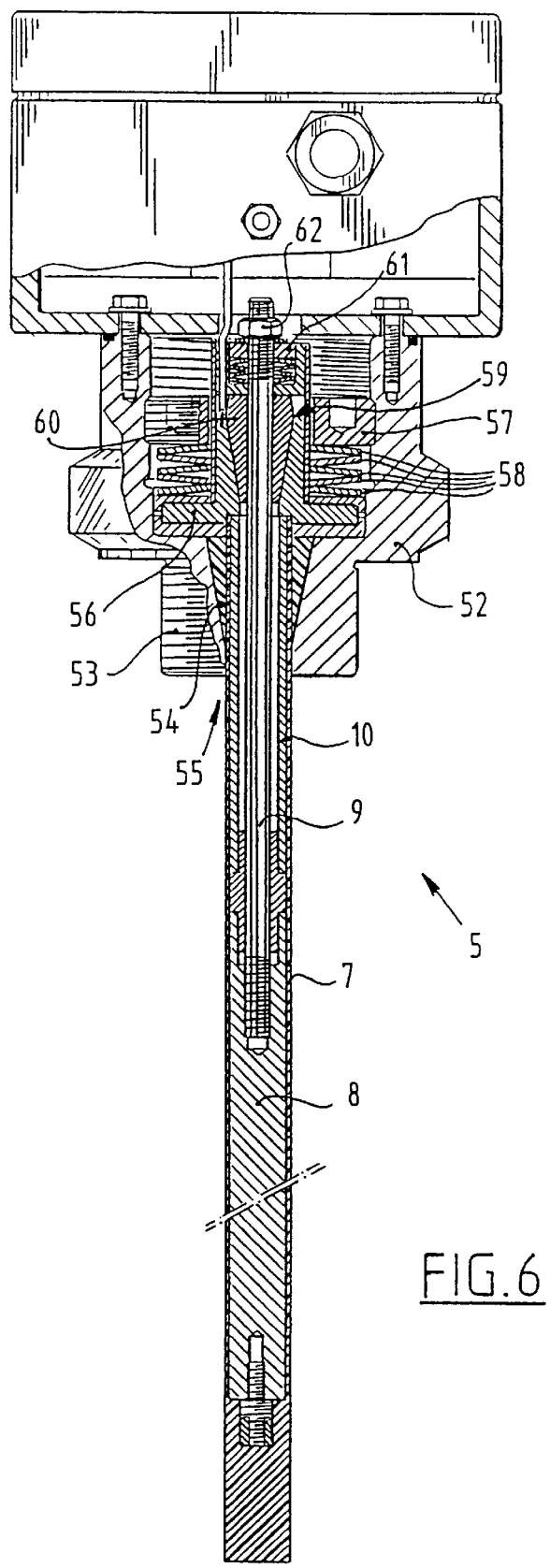
FIG. 6 is a sectional view of an electrode construction according to the present invention.

FIG. 6 shows an embodiment of an electrode which can be used in the present invention; the whole unit is fixed in a lead-through 53 which can be screwed by means of a screw thread 53 into an aperture arranged in the vessel; it is of course also possible to make use of other fixing means. A sleeve 7 manufactured from conducting material is arranged round the electrode body 9. This sleeve is clamped in lead-through body 52 by means of a conical aperture 55 which is arranged in lead-through body 52 and through which electrode body 7 extends. Arranged in said conical aperture is a bush 54 which is externally conical and cylindrical on its inner side. By pressing the bush 54 downward in the drawing the electrode body 7 is clamped fixedly, whereby the conicity ensures excellent sealing. Use is made for this purpose of a pressure body 56 which presses against the flat side of bush 54. For this purpose use is made of cup springs 58 arranged between pressure body 56 and an internal nut 57. When the insulating material, for instance teflon, shows a tendency to begin flowing, this is compensated by the cup springs 58. Otherwise the internal conductor 9 again extends through a conical aperture 59 arranged in pressure element 56. In said conical aperture 59 is arranged a conical bush 60 which likewise provides sealing here; use is made herein of a press-on body 61 in which cup springs are once again arranged and wherein the required force is generated by means of a nut 62.

It will be apparent that the shown embodiments can be varied in diverse ways without falling outside the scope of the invention.

We claim:

1. Apparatus for measuring the capacitance between at least a conductive part of a wall (4) of a vessel (1) and a measuring electrode (8) situated in the vessel (1) and carrying a measuring voltage, comprising a measuring circuit (26) and a compensating circuit (28) for applying a compensating voltage as nearly as possible the same as the measuring voltage to conductors (10,30) present in the vicinity of conductors (9) carrying the measuring voltage, characterized in that the capacitance (27) between the measuring electrode (8) and the vessel wall is connected as a frequency determining element in an oscillator (27,28,29, 31,33,34), so that the frequency of the measuring signal is related to the value of the capacitance (27).

2. Apparatus as claimed in claim 1, characterized in that the period of the measuring signal is substantially proportional to the capacitance (27) and that the measuring circuit (26) is adapted to measure the period of the measuring signal.

3. Apparatus as claimed in claim 2, characterized in that the measuring circuit (26) is provided with a divider (49) which divides the frequency of the measuring signal by a fixed factor.

4. Apparatus as claimed in claim 1, characterized in that the oscillator circuit comprises an RC oscillator (27,28,29, 31,33,34) which is provided with a single fed-back comparator circuit (34) for determining the switching times.

5. Apparatus as claimed in claim 4, characterized in that the measuring circuit (26) comprises a comparator circuit (29) which is adapted to control the RC circuit by means of gate circuits (31,33).

6. Apparatus as claimed in claim 1 claims, characterized in that the apparatus comprises a test circuit (45) for testing the operation of the measuring circuit by switching off a capacitor (51) being coupled parallel to the capacitance (27).

7. Apparatus as claimed in claim 1 characterized in that the input circuit of the measuring circuit (26) is adapted to superimpose an output signal on supply lines (43) of the measuring circuit (26).

8. Apparatus as claimed in claim 7, characterized in that the output circuit (39) of the measurings circuit (26) comprises a controllable impedance which is connected in parallel to the supply circuit of the measuring circuit (26) and which is controlled such that the current flowing through the supply lines (43) is a representation of at least one of the output signals.

9. Apparatus as claimed in claim 1, characterized in that the measuring electrode (8) is provided with an electrode guard (10) and that the compensating circuit (28) is adapted to apply the compensating voltage to the electrode guard (10).

10. Apparatus as claimed in claim 1, characterized in that the measuring circuit (26) is provided with conductors arranged in the vicinity of the conductors (9) carrying the measuring voltage and that the compensating circuit (28) is adapted to apply a compensating voltage to the conductors (9).

11. Apparatus as claimed in claim 1, characterized in that the measuring electrode (8) is received in an electrode body (5) which is provided with an insulating envelope (7) encasing the electrode (8) on all sides.

12. Apparatus as claimed in claim 11, characterized in that the electrode body (5) extends into an aperture which is arranged in a lead-through body (52) and which is at least partially conical, so that at least at the position of the conical part of the aperture a ring (54) is arranged around the electrode body, which ring (54) is substantially cylindrical on its inside and substantially conical on its outside and which is pressed with its conical surface against the conical surface of the aperture by a press-on element (58) placed in a cavity arranged in the lead-through element (52).

13. Apparatus as claimed in claim 12, characterized in that the press-on element is a cup spring (58).

14. Apparatus as claimed in claim 12 characterized in that the conductor (9) connected to the measuring electrode (8) is cylindrical, is arranged centrally in the electrode body (5) and extends beyond the end of the electrode body (5) into an at least partially conical aperture arranged in an insert piece (56), wherein at least at the position of the conical part of the aperture a ring (60) is arranged around the conductor (9), which ring (60) is substantially cylindrical on its inside and substantially conical on its outside and which is pressed with its conical surface against the conical surface of the aperture by a press-on element (58) placed in a cavity arranged in the lead-through element (52).

15. Vessel provided with two apparatuses as claimed in claim 1, characterized in that the first apparatus comprises an electrode (8) which is arranged in the vessel (1) such that the signal generated by the first apparatus represents the degree of filling of the vessel (1) and the permittivity of the content of the vessel (1), that the signal generated by the second apparatus represents the permittivity of the content of the vessel (1), and that a compensating circuit (28) is arranged to compensate the signal generated by the first apparatus with the first signal.

16. Apparatus as claimed in claim 5, characterized in that the apparatus comprises a test circuit (45) for testing the operation of the measuring circuit by switching off a capacitor (51) being coupled parallel to the capacitance (27).

17. Apparatus as claimed in claim 6, characterized in that the input circuit of the measuring circuit (26) is adapted to superimpose an output signal on supply lines (43) of the measuring circuit (26).

18. Apparatus as claimed in claim 8, characterized in that the measuring electrode (8) is provided with an electrode guard (10) and that the compensating circuit (28) is adapted to apply the compensating voltage to the electrode guard (10).

19. Apparatus as claimed in claim 13, characterized in that the conductor (9) connected to the measuring electrode (8) is cylindrical, is arranged centrally in the electrode body (5) and extends beyond the end of the electrode body (5) into an at least partially conical aperture arranged in an insert piece (56), wherein at least at the position of the conical part of the aperture a ring (60) is arranged around the conductor (9), which ring,(60) is substantially cylindrical on its inside and substantially conical on its outside and which is pressed with its conical surface against the conical surface of the aperture by a press-on element (58) placed in a cavity arranged in the lead-through element (52).

20. Vessel provided with two apparatuses as claimed in claim 14, characterized in that the first apparatus comprises an electrode (8) which is arranged in the vessel (1) such that the signal generated by the first apparatus represents the degree of filling of the vessel (1) and the permittivity of the content of the vessel (1), that the signal generated by the second apparatus represents the permittivity of the content of the vessel (1), and that a compensating circuit (28) is arranged to compensate the signal generated by the first apparatus with the first signal.

* * * * *